(12) United States Patent
Sato et al.

(10) Patent No.: US 8,052,868 B2
(45) Date of Patent: Nov. 8, 2011

(54) FUEL FILTER DEVICE

(75) Inventors: Hiroji Sato, Yokohama (JP); Yasushi Ueki, Yokohama (JP); Shigeru Takahashi, Yokohama (JP); Takaya Ogawa, Yokohama (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 268 days.

(21) Appl. No.: 12/071,429

(22) Filed: Feb. 21, 2008

(65) Prior Publication Data
US 2008/0185331 A1 Aug. 7, 2008

Related U.S. Application Data

(63) Continuation of application No. PCT/JP2006/316338, filed on Aug. 21, 2006.

(30) Foreign Application Priority Data

Aug. 25, 2005 (JP) .................................. 2005-244429

(51) Int. Cl.
| | | |
|---|---|---|
| B01D 35/00 | (2006.01) | |
| B01D 35/28 | (2006.01) | |
| B01D 29/11 | (2006.01) | |
| B01D 29/13 | (2006.01) | |
| B01D 29/15 | (2006.01) | |
| B01D 71/06 | (2006.01) | |
| B01D 29/00 | (2006.01) | |

(52) U.S. Cl. ...................... 210/172.4; 210/435; 210/459; 210/460; 210/483; 210/488; 210/490; 210/500.27
(58) Field of Classification Search .................. 210/461, 210/172.4
See application file for complete search history.

(56) References Cited

U.S. PATENT DOCUMENTS
| | | | | |
|---|---|---|---|---|
| 4,312,753 A | * | 1/1982 | Bell ............................... | 210/250 |
| 4,874,510 A | * | 10/1989 | Akira et al. ................. | 210/172.4 |
| 5,639,367 A | * | 6/1997 | Ohzeki et al. ................. | 210/315 |
| 2005/0023201 A1 | * | 2/2005 | Sato ............................. | 210/172 |

FOREIGN PATENT DOCUMENTS
| | | |
|---|---|---|
| JP | 2000-246026 | 9/2000 |
| JP | 2005-048721 | 2/2005 |
| JP | 2005-147087 A | 6/2005 |

* cited by examiner

*Primary Examiner* — Benjamin Kurtz
(74) *Attorney, Agent, or Firm* — Manabu Kanesaka

(57) ABSTRACT

A fuel filter device includes a bag-shaped filter member and is adapted to be attached to communicate an inner space of the filter member with a fuel suction opening in a fuel tank. The filter member is configured in a multilayer structure. At least one layer of the filter member is configured to serve as an inhibition layer having a structure to prevent water in a fuel tank form coming into the inner space of the filter member by a pressure applied to the filter member when the water is frozen.

21 Claims, 9 Drawing Sheets

Fig. 9

| Candidate for inhibition layer | Mesh of PA | 250 mesh of PA | Mesh of PET | Non-woven fabric of PET | | Mesh of PP | Non-woven fabric of PP | | | | | |
|---|---|---|---|---|---|---|---|---|---|---|---|---|
| | | | | A | B | | A | B | C | D | E | F |
| Difference in liquid surface (cm) | 0.6 | 0.7 | 0.5 | 1.5 | 4 | 0.6 | 17 | 25 | 40 | 45 | 49 | – |
| Pressure (kPa) | 0.06 | 0.07 | 0.05 | 0.15 | 0.40 | 0.06 | 1.70 | 2.50 | 4.00 | 4.50 | 4.90 | 22.00 |
| Test method | ① | ① | ① | ① | ① | ① | ① | ① | ① | ① | ① | ② |
| Average opening size | 108 | 60 | 435 | 80 | 30 | 289 | 72 | 34.4 | 27 | 19.9 | 15.1 | 7.1 |
| Existence or non-existence of exudation | × | × | × | × | × | × | × | × | × | ○ | ○ | ○ |
| Texture | Folding weave | Plain weave | Plain weave | NP | SB | Plain weave | NP | SB | MB | MB | MB | MB |

| Candidate for inhibition layer | Nylon | | | PET | | | |
|---|---|---|---|---|---|---|---|
| | A | B | C | B | C | D | E |
| Difference in liquid surface (cm) | 2.3 | 1.2 | 1 | 2 | 0.8 | 0.3 | 0.9 |
| Pressure (kPa) | 0.23 | 0.12 | 010 | 0.20 | 0.08 | 0.03 | 0.09 |
| Test method | ① | ① | ① | ① | ① | ① | ① |
| Average opening size | 59 | 98 | 152 | 62 | 105 | 151 | 200 |
| Existence or non-existence of exudation | × | × | × | × | × | × | × |
| Texture | Plain weave | Plain weave | Plain weave | Plain weave | Plain weave | Plain weave | Plain weave |

FUEL FILTER DEVICE

TECHNICAL FIELD

The present invention relates to an improved filter device, which is attached to a fuel suction opening disposed in a fuel tank for, e.g. an automobile for the purpose of filtering fuel sucked through the suction opening by a fuel pump.

BACKGROUND ART

As a device attached to a fuel suction opening disposed in a fuel tank for, e.g. an automobile and a motorcycle to filter fuel sucked through the suction opening by a fuel pump, there has been known a filter device which includes a bag-shaped member formed of a filter material (see JP-A-2000-246026). In such a type of filter device, it is necessary to sufficiently separate water from oil. Even if it is possible to reliably separate water from oil in a normal situation, it is likely that the pressure generated by the volume expansion of frozen water in water freeze presses water into a filter in, e.g. cold climates, with the result that the water is frozen in the filter. Even if water is frozen as stated above, it has been desired to prevent water from coming into the filter device.

DISCLOSURE OF THE INVENTION

Problem to be Solved by the Invention

It is a main object of the present invention to allow such a filter device to reliably accomplish the function of separating water from oil under various temperature conditions.

Means for Solving the Problem

In order to attain the above-mentioned object, the fuel filter device according to a first aspect of the present invention has the following features (1) to (4):

(1) The fuel filter device includes a bag-shaped filter member and is adapted to be attached to communicate an inner space of the filter member with a fuel suction opening in a fuel tank.

(2) The filter member is configured in a single layer structure or a multilayer structure.

(3) Each of the entire filter member configured in such a single layer structure and at least one layer of the filter member configured in such a multilayer structure has a configuration stated just below.

(4) Each of the entire filter member and at least one layer of the filter member is configured to serve as an inhibition layer having a structure to prevent water in a fuel tank from coming into the filter member by a pressure applied to the filter member when the water is frozen.

In order to attain the above-mentioned object, the fuel filter device according to a second aspect of the present invention has the following features (1) to (4):

(1) The fuel filter device includes a bag-shaped filter member and is adapted to be attached to communicate an inner space of the filter member with a fuel suction opening in a fuel tank.

(2) The filter member is configured in a single layer structure or a multilayer structure.

(3) Each of the entire filter member configured in such a single layer structure and at least one layer of the filter member configured in such a multilayer structure has a configuration stated just below.

(4) Each of the entire filter member and at least one layer of the filter member is configured to serve as an inhibition layer having an average opening size of 20 μm of below.

In order to attain the above-mentioned object, the fuel filter device according to a third aspect of the present invention has the following features (1) to (4):

(1) The fuel filter device includes a bag-shaped filter member and is adapted to be attached to communicate an inner space of the filter member with a fuel suction opening in a fuel tank.

(2) The filter member configured in a single layer structure or a multilayer structure.

(3) Each of the entire filter member configured in such a single layer structure and at least one layer of the filter member configured in such a multilayer structure has a configuration stated just below.

(4) Each of the entire filter member and at least one layer of the filter member is configured to serve as an inhibition layer configured to prevent water from passing therethrough under a water pressure of less than 4.5 kPa.

The filter device according to the present invention includes the inhibition layer having the structure to prevent water from being pressed into the filter element by a pressure applied to the filter element by water frozen in the fuel tank; the structure to set the average opening size of the filter member at 20 μm or below, taking the average opening size of the filter member into account; or the structure to set the resistant pressure to water invasion at 4.5 kPa or above, taking into account the pressure applied by the water passing through the filter element. Any one of these structures not only accomplishes the function of separating water from oil in normal situations but also minimizes the supply of water into the side of a fuel pump by water freeze caused when water contained in fuel is frozen in, e.g. cold climates.

It is preferred that the inhibition layer in the filter member of the filter device is formed of a resin material, which sets the difference between the contact angle to water and the contact angle to fuel at 80 degrees or above.

Even if water is contained in fuel, the inhibition layer formed of such a resin material repels water to prevent the water from coming into the filter member. In other words, it is possible to reliably separate water from oil under various temperature conditions.

When the filter member of the filter device has an outermost layer formed of a mesh fabric and the inhibition layer formed of a non-woven fabric, the inhibition layer being disposed inside the outermost layer, it is possible to prevent the inhibition layer from being brought into direct contact with the inner wall of the fuel tank to be worn.

The filter device may be configured so that two or more layers containing the inhibition layer and formed of a non-woven fabric are included inside the outermost layer, and that a non-woven layer farther from the outermost layer has a smaller average opening size than a non-woven layer closer to the outermost layer.

When the filter device is configured as stated above, a non-woven layer closer to the outermost layer captures dust and dirt having a relatively larger particle size, while a non-woven layer farther from the outermost layer captures dust and dirt having a relatively smaller particle size. Thus, it is possible to properly remove dust and dirt or the like from sucked fuel in such a state that the filter member is hardly clogged.

When the outermost layer is formed of a mesh fabric made of polypropylene, it is possible to properly separate water from oil at the outermost layer since polypropylene sets the difference between the contact angle to water and the contact angle to fuel at 80 degrees or above.

When the inhibition layer is made of polypropylene, it is possible to further properly separate water from oil at the inhibition layer since polypropylene sets the difference between the contact angle to water and the contact angle to fuel at 80 degrees or above.

In a case where the filter member has a multilayer structure, when the respective layers of the filter member are formed of the same resin material, it is possible to form the filter member as a bag-shaped member by laminating the respective layers in a sheet form or a mat form, followed by welding and bonding the respective layers to closely integrate the respective layers.

Effect of the Invention

The filter device according to the present invention accomplishes an excellent function of separating water from oil in various temperature conditions, stably maintaining the function of, e.g. a fuel pump downstream of the filter device for a long period of time.

BRIEF DESCRIPTION OF THE DRAWINGS

FIG. 9 is a table showing test results.

Figure 1:
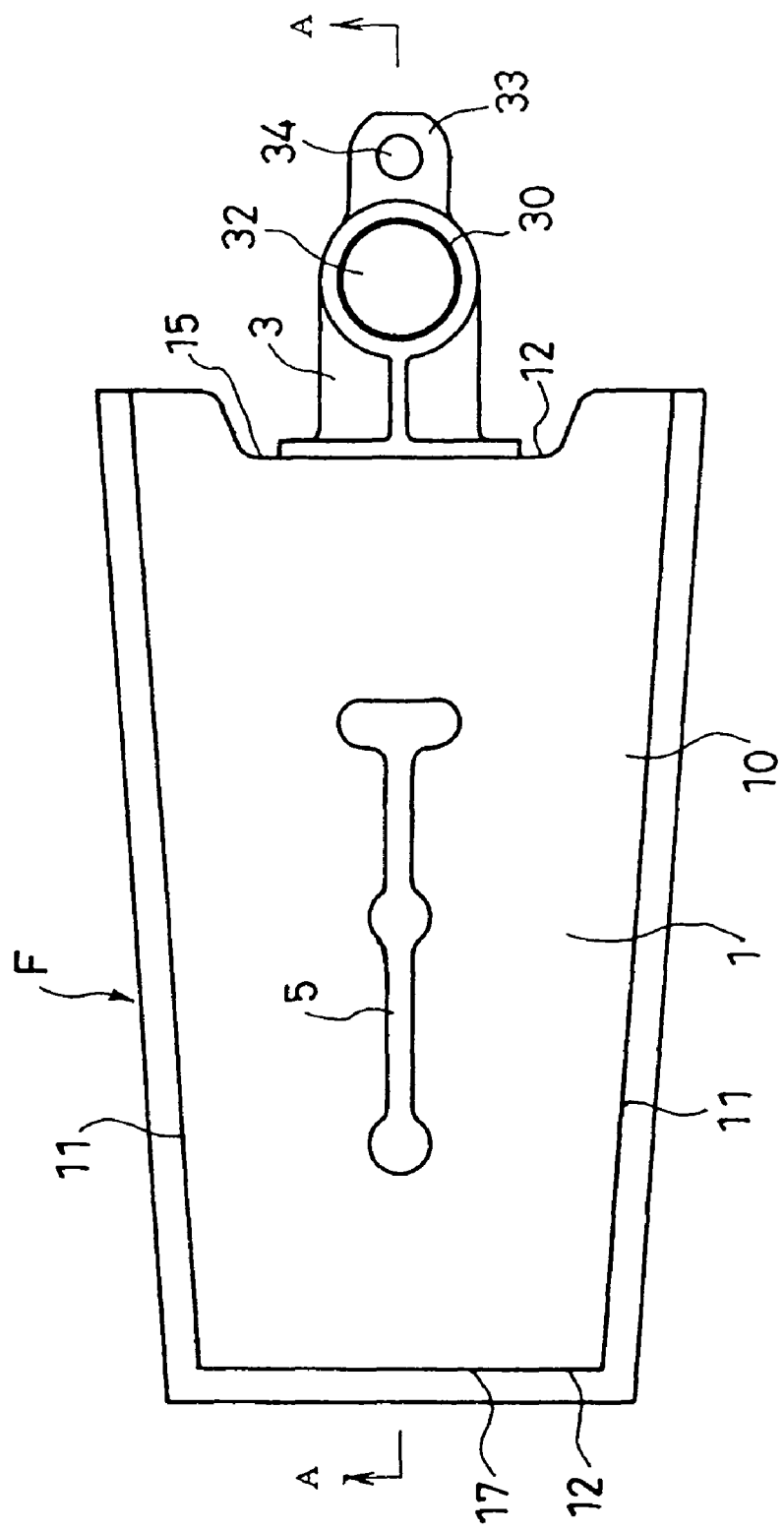
FIG. 1 is a plan view of a filter device F.

| EXPLANATION OF REFERENCE NUMERALS |
| --- |
| F: Filter device |
| T: Fuel tank |
| Tb: Suction opening |
| 10: Filter member |
| 10a: Inhibition layer |

BEST MODE FOR CARRYING OUT THE INVENTION

Now, a preferred embodiment for carrying out the invention will be described based on FIG. 1 through FIG. 11.

Figure 2:
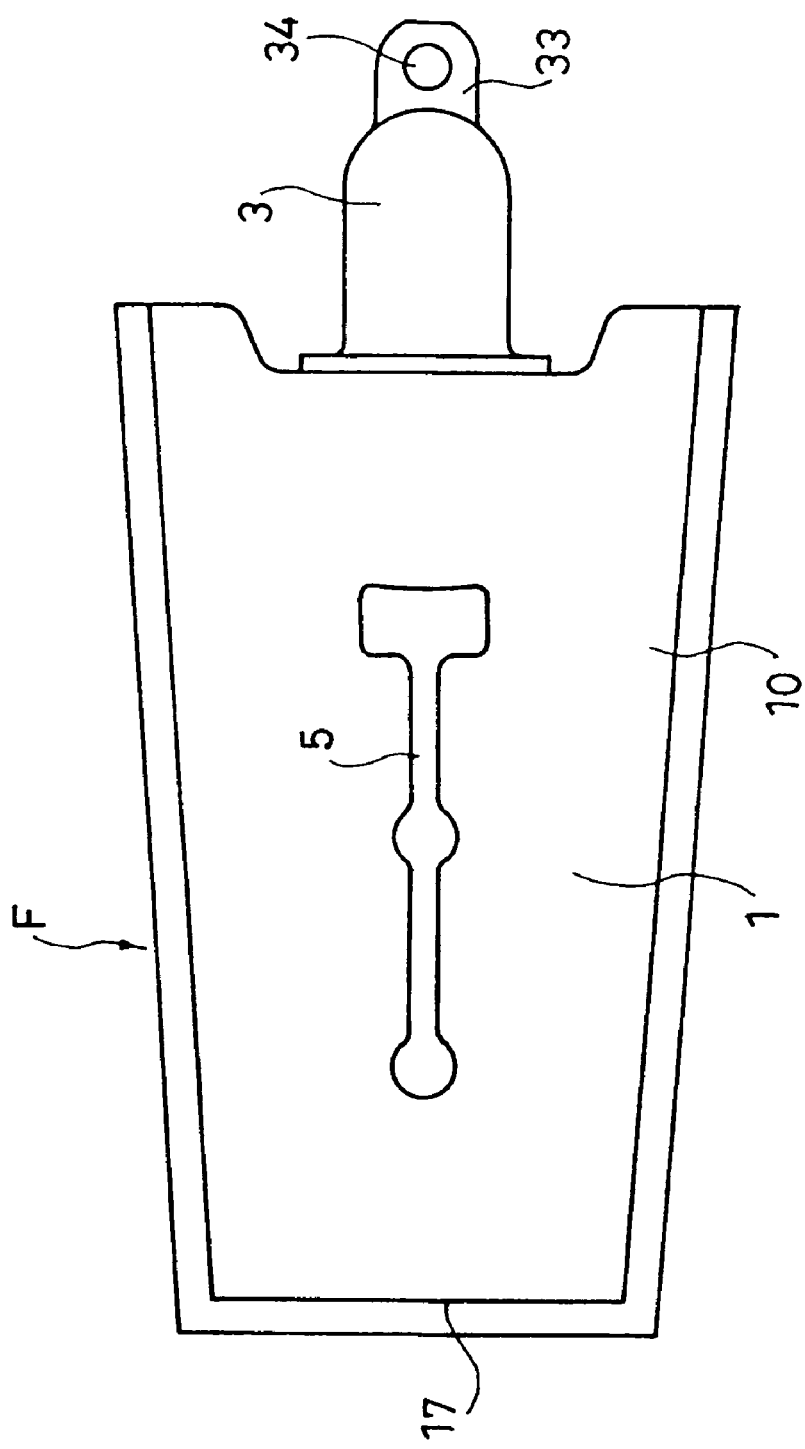
FIG. 2 is a bottom view of the filter device.
Figure 3:
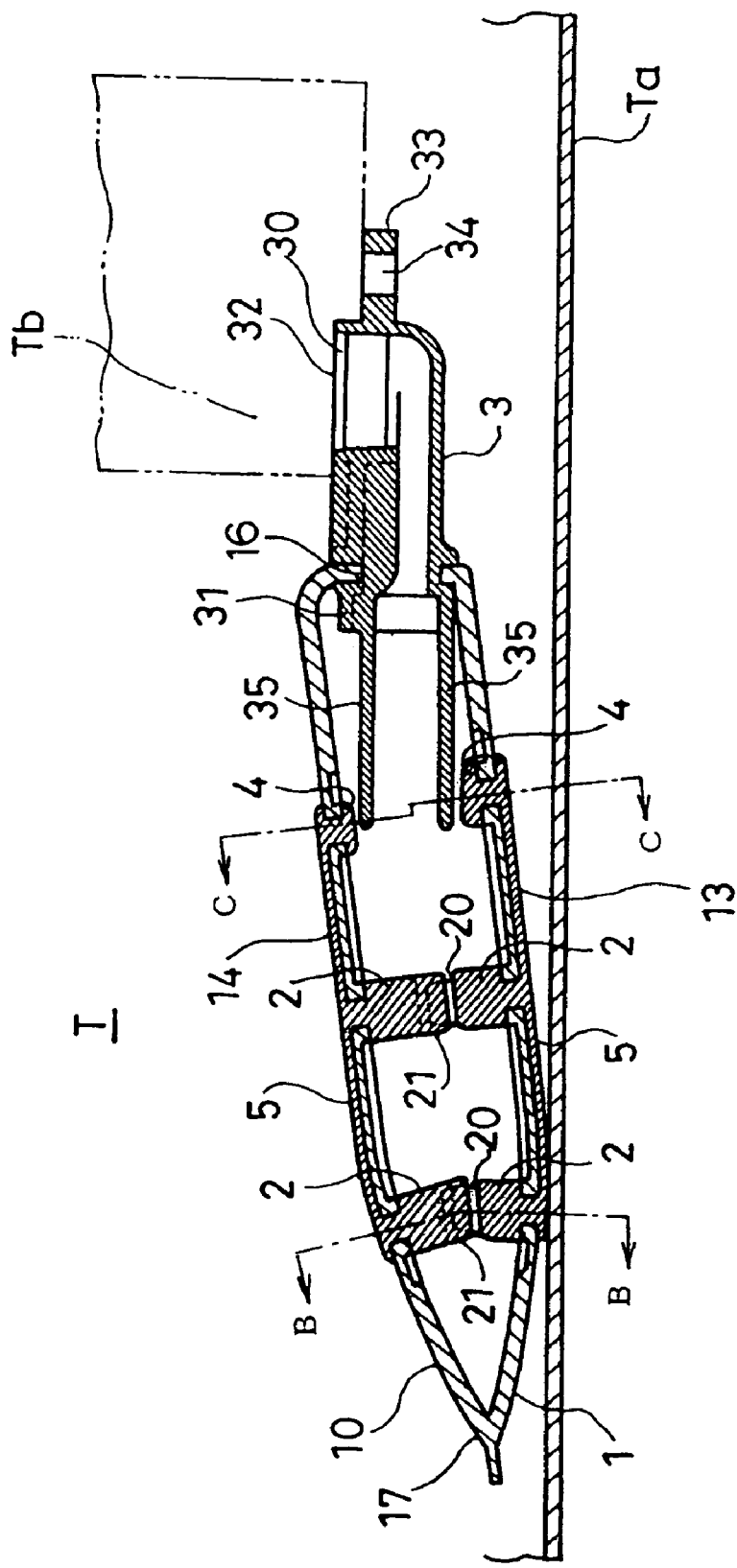
FIG. 3 is a cross-sectional view taken along line A-A of FIG. 1.
Figure 4:
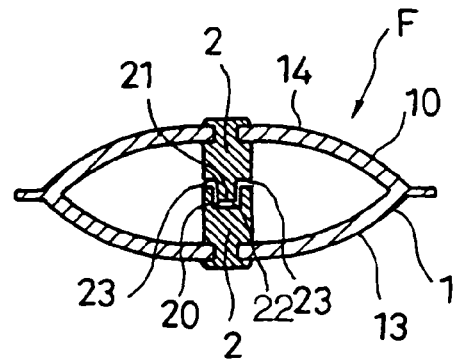
FIG. 4 is a cross-sectional view taken along line B-B of FIG. 3.
Figure 5:
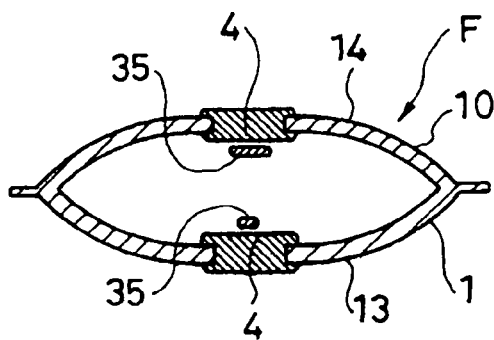
FIG. 5 is a cross-sectional view taken along line C-C of FIG. 3.

FIG. 1 is a view of a filter device F seen from above, and FIG. 2 is a view of the filter device seen from below. Each of FIG. 3 through FIG. 5 and FIG. 11 is a cross-sectional view of the filter device F. In particular, FIG. 3 also shows a part of a fuel tank T, showing how the filter device F is used. FIG. 11 is an enlarged cross-sectional view of essential portions of a filter member 10 forming a bag-shaped member 1 in the filter device F. Each of FIG. 6 through FIG. 8 and FIG. 10 is a view of essential portions of, e.g., a testing instrument in order to readily understand a test method for selecting a filter material forming the filter member 10. FIG. 9 shows results of the tests shown in FIG. 6 through FIG. 8.

The filter device F according to this embodiment is attached to a fuel suction opening Tb disposed in a fuel tank T and is used to filter fuel sucked to the suction opening Tb by a fuel pump.

Typically, the filter device F is attached to a leading end of a fuel pipe in communication with the fuel pump and is used to remove dust and dirt or the like to prevent such dust and dirt or the like from being contained in the fuel sucked through the leading end.

The filter device F includes the bag-shaped member 1, collapse-preventing members 2, a conduit 3 and receiving members 4.

(Bag-Shaped Member 1)

The bag-shaped member 1 is attached to the suction opening Tb to communicate the suction opening Tb with an inner space thereof and is formed of the filter member 10. When a negative pressure is applied to the suction opening Tb, fuel, which has passed through the bag-shaped member 1 to be filtered therein, is sucked into the suction opening Tb and is sent to an internal combustion engine.

The filter member 10 is configured in a single layer structure or a multilayer structure (the shown filter member is configured in a multilayer structure). Each of the entire filter member 10 in a single layer structure, and at least one of the layers of the filter member 10 in a multilayer structure serves as an inhibition layer 10a, which is configured to prevent water from coming into the inner space of the filter member 10 by a pressure applied to the filter member when water in the fuel tank T is frozen.

(Method for Selecting the Inhibition Layer 10a)

First, the following test method 1 or test method 2 was performed to measure the exudation pressure of each of filter materials as candidates for the inhibition layer 10a forming the filter member 10.

Figure 6:
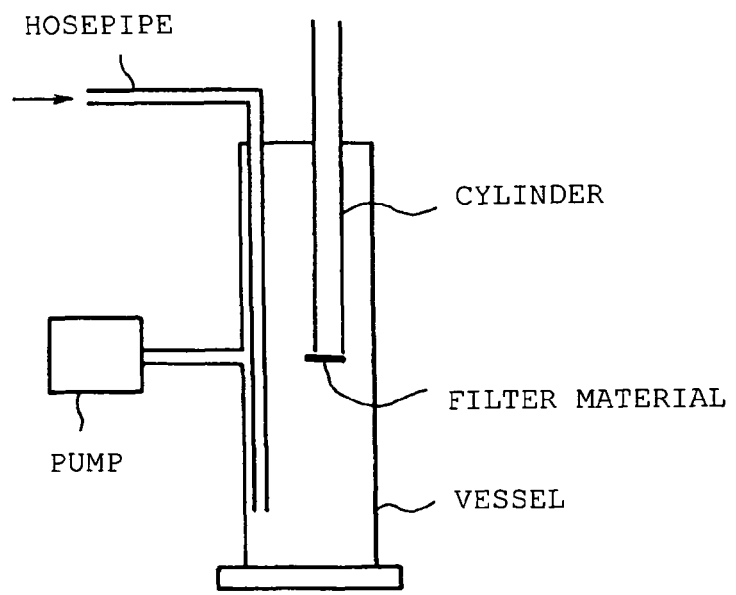
FIG. 6 is a schematic view showing a test method.

Test Method 1 (FIG. 6)

(1) A cylinder, which has a lower end closed by a filter member as a candidate for the inhibition layer 10a, is put into a vessel having an upper open end. The filter material has been preliminarily immersed in fuel.

(2) Water is poured into the vessel referred to in item (1) through a hosepipe.

(3) The pressure that is applied when water has exuded into the cylinder through the filter material referred to item (1) is calculated.

Figure 7:
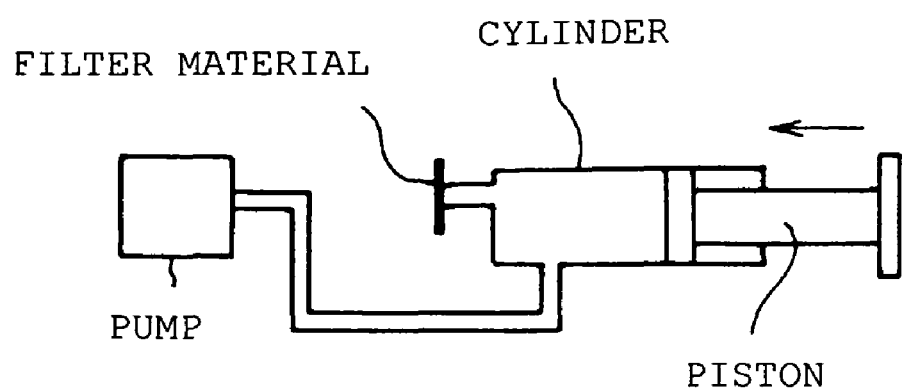
FIG. 7 is a schematic view showing a test method.

Test Method 2 (See FIG. 7)

(1) The leading opening of a cylinder, which is formed in a cylindrical shape as in an injector, is closed by a filter member as a candidate for the inhibition layer 10a. The filter member has been preliminarily immersed in fuel.

(2) The cylinder is filled with water with the piston being retracted.

(3) The piston is moved forwardly from the state referred to in item (2), and the pressure that water starts leaking out the leading edge of the cylinder at is calculated.

Next, the filter device F was configured to have the bag-shaped member 1 formed of a filter material as a candidate for the inhibition layer 10a for each of the filter materials as candidates for the inhibition layer 10a. The filter device was put from above into a bath containing fuel and water so that every portion of the bag-shaped member 1 was brought into contact with the fuel at an upper position in the bath at least one time in the middle of being put into the bath and that a lower portion of the filter device F was immersed in the water while an upper portion of the filter device was immersed in the fuel. The filter device was supported, keeping that position.

Figure 8:
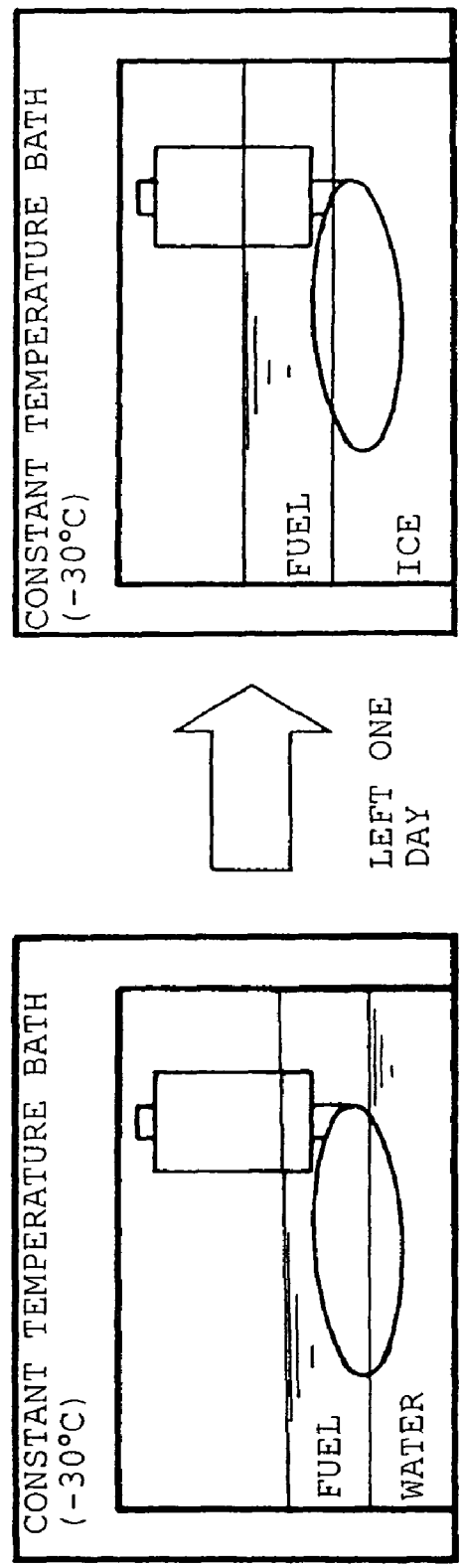
FIG. 8 is a schematic view showing a test method.

Then, the bath with the filter device therein was left for 1 day in the environment of a temperature of −30° C. (FIG. 8). After the bath was left as stated above, it was checked whether exudation occurred in the filter device F or not, i.e. whether ice existed in the filter device or not.

The results are shown in FIG. 9. In FIG. 9, "mesh" means a mesh fabric as a candidate for the inhibition layer 10a "X" and "○" mean the existence of exudation and the non-existence of exudation, respectively, for existence or non-existence of exudation, and "folding", "plain", "NP", "SB" and "MB" mean folding weave, plain weave, a needle punch method, a span bond method and a melt blown method, respectively, for texture.

Among the candidates for the inhibition layer 10a, ones that were not subjected to exudation in the filter device F by the test shown in FIG. 8 were ones that had an average opening size of 20 μm or below and prevented water from exuding under a water pressure of less than 4.5 kPa, specifically a non-woven fabric made of polypropylene and having an average opening size of 19.9 μm, a non-woven fabric made of polypropylene and having an average opening size of 15.1 μm, and a non-woven fabric made of polypropylene and having an average opening size of 7.1 μm. In this Description, the openings in connection with such average opening sizes mean meshes of a mesh fabric and interstices among fibers forming a non-woven fabric.

The filter device according to this embodiment includes the inhibition layer 10a having the structure to prevent water from being pressed into the inner space of the filter member F by a pressure applied to the filter element by water frozen in the fuel tank T. The filter device according to this embodiment minimizes the supply of water into the side of the fuel pump by water freeze caused when water contained in fuel is frozen in, e.g. cold climates.

In this embodiment, each of the entire filter element 10 configured in a single layer structure, and at least one layer of the filter element 10 configured in a multilayer structure may be formed of such a resin material that sets the difference between the contact angle to water and the contact angle to fuel at 80 degrees or above.

Figure 10:
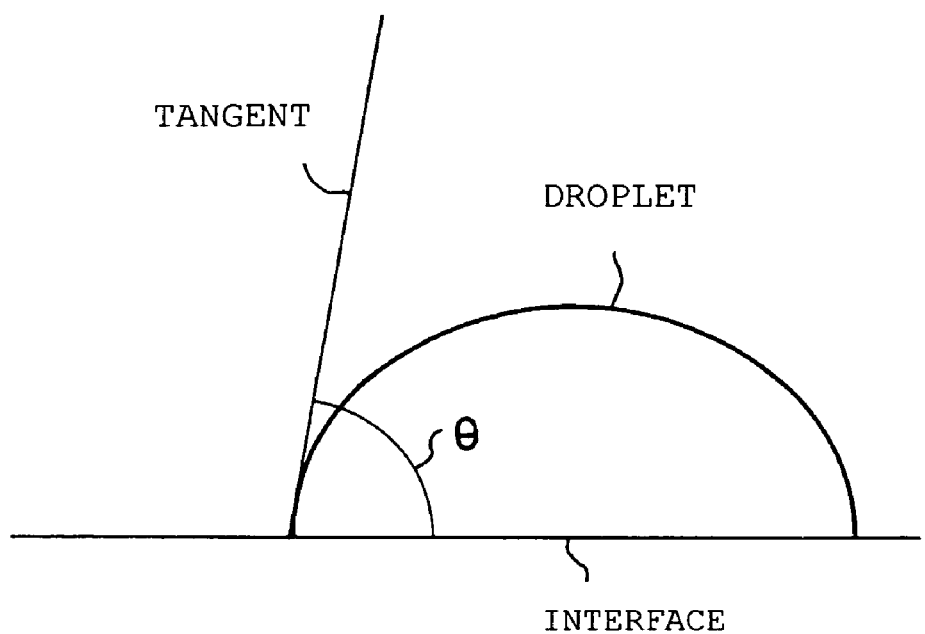
FIG. 10 is a schematic view showing a test method.
Figure 11:
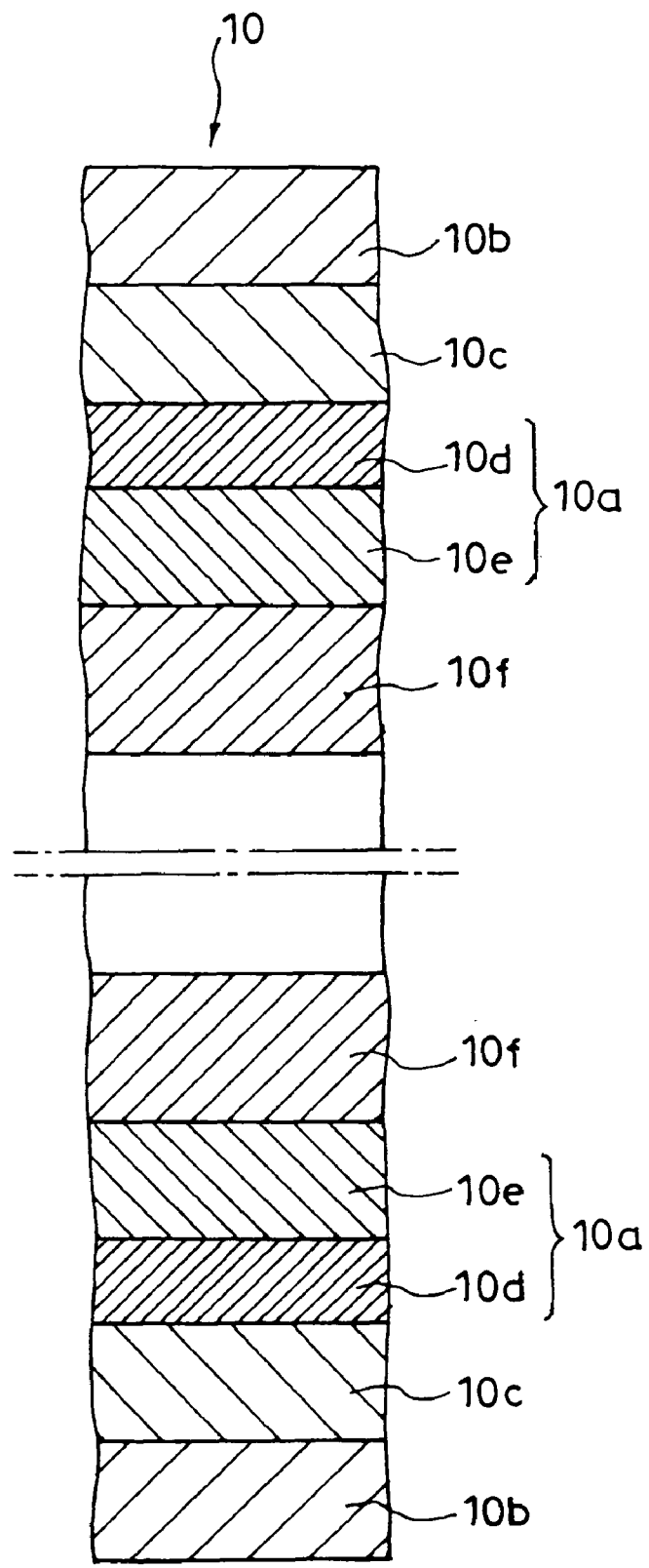
FIG. 11 is an enlarged cross-sectional view showing essential portions of the filter device F.

In this Description, the above-mentioned contact angle means an angle θ, which when a water or fuel droplet drops on the material forming the filter member 10, the tangent of the water or fuel droplet at an end of the water or fuel droplet forms with the interface between the water or fuel droplet and the material surface (see FIG. 10).

When a fuel droplet drops on a resin material, the fuel droplet is apt to spread (in other words, the resin material is easily wetted) in comparison with water droplet, with the result that the fuel droplet has a smaller contact angle than a water droplet.

In this embodiment, each of the entire filter element 10 configured in a single layer structure, and at least one layer of the filter element 10 configured in a multilayer structure is formed of the above-mentioned resin material, and the above-mentioned resin material sets the difference between the contact angle to water and the contact angle to fuel at 80 degrees or above. As a result, even if water is contained in fuel, the water was repelled to be prevented from coming into the inner space of the filter member 19 through the openings of the filter member, i.e. the meshes or the interstices among the fibers, with the result that water is prevented from being supplied to the fuel suction opening Tb.

When the inhibition layer 10a is formed of the above-mentioned resin material, the filter member is able to reliably separate water from oil under various temperature conditions.

In this embodiment, the following method was performed to measure the above-mentioned contact angle. Based on the results of the measurement, the resin materials that set the difference between the contact angle to water and the contact angle to fuel at 800 or above were selected as materials suited for the filter member.

(Method for Measuring Contact Angle)

(1) A plate-shaped test piece is prepared, and the test piece is degreased by ethyl alcohol.

(2) The test piece referred to item (1) is left at normal temperature for 30 minutes.

(3) A certain amount of droplet is dropped on the test piece obtained in the step of item (2).

(4) A picture showing the situation of the droplet on the test piece is digitally taken after lapse of 1 sec for water and after lapse of 1/60 sec for regular gasoline. The picture is subjected to image processing to find the contact angle.

Totally six kinds of test pieces were prepared, which were made of polypropylene (PP), polyethylene (PE), Nylon 6 (PA6), Nylon 66 (PA66), polybutylene terephthalate (PBT) and polyethylene terephthalate (PET). A droplet of water and a droplet of regular gasoline were respectively dropped at five locations on a single test piece to find the average contact angle for the five locations. The measurement was performed by a product in the name of "DropMaster500" manufactured by Kyowa Interface Science Co., LTD. The results of the measurement are shown below:

TABLE 1

| Contact angle | PP | PE | PA6 | PA66 | PBT | PET |
|---|---|---|---|---|---|---|
| Water: a | 100.7 | 93.1 | 64.8 | 63.1 | 75.1 | 71.5 |
| Gasoline: b | 19.5 | 14.3 | 13.7 | 15.1 | 14.5 | 14.6 |
| a − b | 81.2 | 78.8 | 51.1 | 48 | 60.6 | 56.9 |

In other words, the resin material that is considered as being effective in separating water from oil, i.e. the resin material that sets the difference between the contact angle to water and the contact angle to fuel at 80° is polypropylene.

In the shown example, the filter member of the filter device is configured in such a multilayer structure that the filter member includes an outermost layer 10b formed of a mesh fabric and the inhibition layer 10a positioned inside the outermost layer and formed of a non-woven fabric.

In the shown example, this arrangement prevents the inhibition layer 10a from being brought into direct contact with, e.g. the inner wall of the fuel tank T (typically a tank bottom Ta) to be worn.

In the shown example, the filter member is configured so that at least two layers containing the inhibition layer 10a and formed of a non-woven fabric are disposed inside the outermost layer 10b and that a layer farther from the outermost layer of the filter device F has a smaller average opening size than a layer closer to the outermost layer.

The filter device F configured as stated above captures dust and dirt having a relatively large particle size by a non-woven fabric layer disposed at a position closer to the outermost layer of the filter member 10 and captures dust and dirt having a relatively small particle size by a non-woven fabric layer disposed at a position farther from the outermost layer of the filter member 10. Thus, the filter device is able to properly remove dust and dirt or the like from sucked fuel in such a state that the filter member 10 is hardly clogged.

In the shown example, the respective layers forming the filter member 10 may be formed of the same kind of resin material.

By this arrangement, the filter device F may configure the filter member 10 in a bag-shape form by laminating the respective layers in a sheet form or a mat form, followed by welding and bonding the respective layers to closely integrate the respective layers.

In the shown example, the outermost layer 10b is formed of a mesh fabric made of polypropylene. The filter member includes four layers formed of non-woven fabrics made of polypropylene inside the outermost layer 10b.

In the shown example, the filter member includes five layers of the outermost layer 10b formed of a mesh fabric (having 70 mesh and comprising plain weave of PP fibers having a diameter 180 μm), a first inner layer 10c formed of a non-woven fabric (having an average opening size of 27 μm and comprising PP fibers having a diameter 7 μm, produced by a melt blown method so as to have a density of 40 g/m$^2$), a second inner layer 10d formed of a non-woven fabric disposed inside the first inner layer (having an average opening size of 15.1 μm and comprising PP fibers having a diameter of 5 μm, produced by a melt blown method so as to have a density of 30 g/m$^2$), a third inner layer 10e formed of a non-woven fabric and disposed inside the second inner layer (having an average opening size of 7.1 μm and comprising PP fibers having a diameter of 3 μm, produced by a melt blown method so as to have a density of 40 g/m$^2$), and a fourth inner layer 10f formed of a non-woven fabric and disposed inside the third inner layer (having an average opening size of 34.4 μm and comprising PP fibers having a diameter of 20 μm, produced by a span bond method so as to have a density of 80 g/m$^2$). In the filter member configured stated above, the second inner layer 10d and the third inner layer 10e serve as the above-mentioned inhibition layer 10a (FIG. 11).

It was revealed that the filter device F including the filter member 10 configured as stated above had the functions of effectively separating water from oil and properly capturing dirt and dust, and prevented water from coming into the inner space of the filter member 10 by a pressure caused by the volume expansion of water when the water containing in fuel was frozen.

In a shown example, the bag-shaped member 1 is configured in such an elongated bag-shaped form to include two long sides 11 and 11 and two short sides 12 and 12. One of the two short sides 12 and 12 is formed to be shorter than the other, and the two long sides 11 and 11 are inclined so as to gradually decrease the pitch between the opposing long sides 11 as the long sides approach the one short side 11. In the shown example, the bag-shaped member 1 includes a lower portion 13 and an upper portion 14. In the shown example, the filter member 10, which is formed in an elongated shape, is folded in two at its substantially middle portion in its longitudinal direction. The filter member, which is folded in two as stated above, is formed in the above-mentioned elongated bag-shaped member 1 by being heated and welded at its overlapped edges along the edges except for a folded portion 15. The folded portion 15 includes the conduit 3 as stated later.

(Conduit 3)

The conduit 3 has one end 30 connected to the suction opening Tb and the other end 31 communicating with the inner space the bag-shaped member 1.

In the shown example, the conduit 3 is formed as a pipe having a substantially rectangular cross-section. The one end 30 has a round hole 32 formed to be open upwardly and a projection 33 formed to include a receiving hole 34 for a bar, which, although not shown, projects from the suction opening Tb. The conduit 3 is connected to the suction opening Tb by inserting the bar into the receiving hole 34 of the projection 33 as well as communicating the suction opening Tb with the round hole 32. By this connection, the filter device F is attached to the suction opening Tb. In the shown example, the conduit 3 has the other end 31 put into the inner space of the bag-shaped member 1 through a through hole 16 formed in the folded portion 15 of the filter member 1. In the shown example, the conduit 3 is formed of a synthetic resin and is integrally formed with the filter member 10 at the above-mentioned folded portion 15 by insert molding wherein the filter member 10 is put as an insert in a mold, being unfolded.

The conduit 3 includes elastic pieces 35 projecting from the other end 31 thereof. In the shown example, the elastic pieces are configured as elongated plate-shaped pieces extending along the longitudinal direction of the bag-shaped member 1, which project from a middle portion of an upper edge and a middle portion of a lower edge of the other end 31 of the conduit 3 toward the short side 12 having a shorter length in the bag-shaped member 1 (hereinbelow, referred to as the leading end of the bag-shaped member 1), respectively. In this shown example, the elastic pieces 35 are configured to be respectively brought into contact with the receiving members 4, which are fixed to an inner surface of the bag-shaped member 1, and which will be stated later.

(Collapse-Preventing Members 2)

The collapse-preventing members 2 are configured to be fixed to the lower portion 13 and the upper portion 14 of the bag-shaped member 1 so as to project toward the inner space of the bag-shaped member 1, respectively.

In the shown example, the collapse preventing members 2 are disposed at middle positions in the longitudinal direction of the bag-shaped member 1 and at positions close to the leading end of the bag-shaped member 1. Each of the collapse preventing members 2 is disposed at a middle position of the bag-shaped member 1 in a width direction of the bag-shaped member. Each of the collapse preventing members 2 is formed of a synthetic resin and is formed as such a circular member to have one end fixed to the bag-shaped member 1.

The collapse-preventing members 2 on the lower portion 13 and the collapse-preventing members 2 on the upper portion 14 of the bag-shaped member 1 are configured so that paired collapse-preventing members are butted against each other, having a recess 20 engaged with a projection 21, the recess being formed in one of the paired collapse-preventing members and the projection being formed on the other.

In the shown example, specifically, each of the collapse-preventing members 2 on the lower portion 13 has a slot 22 formed in the opposing end thereof, and each of the collapse-preventing members 2 on the upper portion 14 has the projection 21 formed on the opposing end thereof so as to be received into the slot 22 formed in the counterpart. The slot 22 has both edges formed to be open outwardly.

Each of the projections 21 is formed so as to extend in a diametrical direction of the collapse-preventing member 2 of the upper portion 14 and to include stepped portions 23 on both sides thereof. The stepped portions are butted against the opposing end of the collapse-preventing member 2 of the lower portion 13 as the counterpart.

Thus, the projection 21 formed on one of paired collapse-preventing members 2, which are butted against each other at the middle position in the longitudinal direction of the bag-shaped member 1, is engaged with the recess 20 formed in the collapse-preventing member 2 as the counterpart so as to be slidable in the direction for the recess 20 to extend as the slot in this embodiment. Specifically, each of the projections is slidable along the longitudinal direction of the bag-shaped member 1 in the shown example.

In the shown example, each of the projections 21 is slidable so as to absorb misalignment between the lower portion 13 and the upper portion 14 of the bag-shaped member 1 when the bag-shaped member 1 is brought into contact with the tank bottom Ta.

In other words, in the shown example, the filter device F is attached to and supported by the suction opening Tb at the conduit 3, the leading end of the bag-shaped member 1 is normally located at a position lower than the suction opening Tb, and the leading end of the bag-shaped member 1 is brought into contact with the tank bottom Ta, such as the bottom of a fuel tank or the bottom of a subtank disposed in a fuel tank. If the tank bottom Ta is subjected to lift or another movement in, e.g. case where the pressure in a fuel tank drops to a level lower than the atmospheric pressure, the bag-shaped member 1 is pressed at the leading end thereof from below to be subjected to a force, which tends to put the lower portion 13 and the upper portion 14 out of alignment. However, this misalignment is absorbed by the above-mentioned sliding movement because of being caused in the longitudinal direction of the bag-shaped member 1.

(Receiving Members 4)

The receiving members 4 are fixed to the inner surface of the bag-shaped member 1 so as to be brought into contact with the elastic pieces 35 formed on the conduit 3.

In the shown example, the receiving members 4 are respectively formed on the lower portion 13 and the upper portion 14 of the bag-shaped member 1 at portions on the side where the bag-shaped member 1 communicates with the conduit 3. In the shown example, each of the receiving members 4 is formed of a synthetic resin. Each of the receiving members 4 is configured as a projection slightly projecting from the inner surface of the bag-shaped member 1.

In the shown example, while the filter member 10 forming the bag-shaped member 1 is unfolded, the collapse-preventing members 2 and the receiving members are integrally with the inner surface of the bag-shaped member 1 of the filer member 10 so that two collapse-preventing members 2 and a receiving member 4 are formed on the lower portion 13 at positions between one end of the unfolded filter member 10 and a substantially middle position of the lower portion in the longitudinal direction of the filter member in this order by insert molding with the unfolded filter member 10 put as an insert, and that the remaining two collapse-preventing members 2 and the remaining receiving member 4 are formed on the upper portion 14 at positions between the other end of the unfolded filter member 10 and a substantially middle position of the upper portion in the longitudinal direction of the filter member in this order by insert molding with the unfolded filter member 10 put as an insert.

In the shown example, the two collapse-preventing members 2 and the remaining receiving member 4 formed on each of the lower portion 13 and the upper portion 14 of the bag-shaped member 1 pass through the wall of the filter member 10 to be unified with a synthetic resin beam 5 formed on each of both outer sides of the bag-shaped member 1. In the shown example, each of the beams 5 is formed by the above-mentioned insert molding. The beams increase the unity of the respective layers of the filter member 10 in the above-mentioned layer structure.

The collapse-preventing members 2 formed on the lower portion 13 and the collapse-preventing members 2 formed on the upper portion 14 are configured so as to be butted against each other in pairs in the inner space of the bag-shaped member 1. By this arrangement, it is possible to constantly keep a gap of not less than a certain distance between the lower portion 13 and the upper portion 14 of the bag-shaped member 1. In other words, when the paired collapse-preventing members 2 are butted together, it is possible to ensure a gap having a length equal to the sum of the projecting lengths of the paired collapse-preventing members 2 at portions where the paired collapse-preventing members are formed. Since the collapse-preventing members 2 formed on the lower portion 13 and the collapse-preventing members 2 formed on the upper portion 14 are butted against each other in pairs in the inner space of the bag-shaped member 1 with the recess 20 formed in one of each pair being engaged with the projection 21 formed in the other of each pair, it is possible to stably maintain a state where the gap is kept at the above-mentioned constant distance. By this arrangement, it is possible to avoid, e.g. a drawback that the bag-shaped member 1 is deformed in an unexpected form to change the suction pressure of fuel into the suction opening Tb in an unexpected way.

Since the conduit 3, which is connected to the suction opening Tb, has the elastic pieces 35 formed thereon to be brought into contact with the receiving members 4 fixed to the inner surface of the bag-shaped member 1, it is possible to prevent the bag-shaped member 1 from being deformed to narrow or close the portion where the conduit 3 communicate with the bag-shaped member 1. Since the lower portion 13 of the bag-shaped member 1, which may be lifted by contact of the bag-shaped member 1 with the tank bottom Ta, is supported by the elastic piece 35 close to the lower portion in the inner space of the bag-shaped member 1, it is possible to bring the bag-shaped member 1 into contact with the tank bottom Ta with a certain force. Since the elastic pieces 35 are formed to be brought into contact with the receiving members 4, it is possible to prevent a case where an elastic piece 35 is brought into direct contact with the filter member 10 forming the bag-shaped member 1 to damage the filter member 10.

The collapse preventing members 2 formed on the lower portion 13 and the collapse preventing portions 2 formed on the upper portion 14 are combined so as to be butted together in the inner space of the bag-shaped member 1, having the projections 21 slidably engaged with the recesses 20. By this arrangement, even if a force is applied to the bag-shaped member 1 to put the lower portion 13 out of alignment with the upper portion 14 in the direction for the projection and the recesses to be slidable, it is possible to absorb the misalignment to some extent, with the result that it is possible to prevent, e.g. a wrinkle from being formed in the bag-shaped member 1 by such a force.

In the shown example, the sliding movement is made in a direction to absorb the misalignment between the lower portion 13 and the upper portion 14 of the bag-shaped member 1, which is caused when the bag-shaped member 1 is brought into contact with the tank bottom Ta. Thus, it is possible to prevent, e.g., a wrinkle from being formed in the bag-shaped member 1, in particular when a force caused by contact with the tank bottom Ta is applied to the bag-shaped member 1.

What is claimed is:

1. A fuel filter device comprising:
    a bag-shaped filter member adapted to communicate an inner space of the filter member with a fuel suction opening in a fuel tank, the filter member comprising at least one layer,
    wherein the at least one layer is an inhibition layer having a structure to prevent water in a fuel tank from coming into the inner space of the filter member by pressure applied to the filter member when the water is frozen, and the inhibition layer is formed of a resin material, which sets a difference between a contact angle to water and a contact angle to fuel at 80 degrees or above, upper and lower resin beams respectively formed on upper and lower external surfaces of the filter member;

upper and lower collapse preventing members which are respectively associated with the upper and lower resin beams and which engage one another within the inner space to limit a distance by which the upper and lower resin beams can approach one another under the pressure applied to the filter member;

receiving members which extend into the inner space from the upper and lower resin beams; and a conduit member attached to the filter member adapted to communicate with the fuel suction opening, the conduit member being formed as a pipe and having plate-shaped elastic pieces projecting from one end thereof and entering the inner space of the filter member, the plate-shaped elastic pieces being spaced apart from each other and contacting the receiving members to prevent a portion of the filter member which communicates with the conduit from being narrowingly deformed under the pressure applied to the filter member.

2. The fuel filter device according to claim 1, further comprising an outermost layer formed of a mesh fabric, and wherein the inhibition layer is disposed inside the outermost layer and is formed of a non-woven fabric.

3. The fuel filter device according to claim 2, further comprising at least two layers including the inhibition layer and a layer formed of a non-woven fabric disposed inside the outermost layer, wherein a layer farther from the outermost layer of the filter device has a smaller average opening size than a layer closer to the outermost layer.

4. The fuel filter device according to claim 2, wherein the outermost layer is formed of a mesh fabric made of polypropylene.

5. The fuel filter device according to claim 1, wherein the inhibition layer is made of polypropylene.

6. The fuel filter device according to claim 1, wherein the filter member comprises a multilayer structure, and the multilayer structure has all layers formed of the same resin material.

7. The fuel filter device according to claim 1, wherein the upper and lower collapse preventing members have a projection and a recess slidably engaging each other.

8. A fuel filter device comprising:

a bag-shaped filter member adapted to communicate an inner space of the filter member with a fuel suction opening in a fuel tank, the filter member comprising at least one layer, wherein the at least one layer is an ice pressure inhibition layer having an average opening size of 20 μm or below, and the inhibition layer is made of a resin material, which sets a difference between a contact angle to water and a contact angle to fuel at 80 degrees or above, upper and lower resin beams respectively formed on upper and lower external surfaces of the filter member;

upper and lower collapse preventing members which are respectively associated with the upper and lower resin beams and which engage one another within the inner space to limit a distance by which the upper and lower resin beams can approach one another under the pressure applied to the filter member;

receiving members which extend into the inner space from the upper and lower resin beams; and a conduit member attached to the filter member adapted to communicate with the fuel suction opening, the conduit member being formed as a pipe and having plate-shaped elastic pieces projecting from one end thereof and entering the inner space of the filter member, the plate-shaped elastic pieces being spaced apart from each other and contacting the receiving members to prevent a portion of the filter member which communicates with the conduit from being narrowingly deformed under the pressure applied to the filter member.

9. The fuel filter device according to claim 8, further comprising an outermost layer formed of a mesh fabric, and wherein the inhibition layer is disposed inside the outermost layer and is formed of a non-woven fabric.

10. The fuel filter device according to claim 9, further comprising at least two layers including the inhibition layer and a layer formed of a non-woven fabric disposed inside the outermost layer, wherein a layer farther from the outermost layer of the filter device has a smaller average opening size than a layer closer to the outermost layer.

11. The fuel filter device according to claim 9, wherein the outermost layer is formed of a mesh fabric made of polypropylene.

12. The fuel filter device according to claim 8, wherein the inhibition layer is made of polypropylene.

13. The fuel filter device according to claim 8, wherein the filter member comprises a multilayer structure, and the multilayer structure has all layers formed of the same resin material.

14. The fuel filter device according to claim 8, wherein the upper and lower collapse preventing members have a projection and a recess slidably engaging each other.

15. A fuel filter device comprising:

a bag-shaped filter member adapted to communicate an inner space of the filter member with a fuel suction opening in a fuel tank, the filter member comprising at least one layer, wherein the at least one layer is an water inhibition layer configured to prevent water from passing therethrough under a water pressure of less than 4.5 kPa, and the inhibition layer is made of a resin material, which sets a difference between a contact angle to water and a contact angle to fuel at 80 degrees or above, upper and lower resin beams respectively formed on upper and lower external surfaces of the filter member;

upper and lower collapse preventing members which are respectively associated with the upper and lower resin beams and which engage one another within the inner space to limit a distance by which the upper and lower resin beams can approach one another under the pressure applied to the filter member;

receiving members which extend into the inner space from the upper and lower resin beams; and a conduit member attached to the filter member adapted to communicate with the fuel suction opening, the conduit member being formed as a pipe and having plate-shaped elastic pieces projecting from one end thereof and entering the inner space of the filter member, the plate-shaped elastic pieces being spaced apart from each other and contacting the receiving members to prevent a portion of the filter member which communicates with the conduit from being narrowingly deformed under the pressure applied to the filter member.

16. The fuel filter device according to claim 15, further comprising an outermost layer formed of a mesh fabric, and wherein the inhibition layer is disposed inside the outermost layer and is formed of a non-woven fabric.

17. The fuel filter device according to claim 16, further comprising at least two layers including the inhibition layer and a layer formed of a non-woven fabric disposed inside the outermost layer, wherein a layer farther from the outermost layer of the filter device has a smaller average opening size than a layer closer to the outermost layer.

18. The fuel filter device according to claim 16, wherein the outermost layer is formed of a mesh fabric made of polypropylene.

19. The fuel filter device according to claim 15, wherein the inhibition layer is made of polypropylene.

20. The fuel filter device according to claim 15, wherein the filter member comprises a multilayer structure, and the multilayer structure has all layers formed of the same resin material.

21. The fuel filter device according to claim 15, wherein the upper and lower collapse preventing members have a projection and a recess slidably engaging each other.

* * * * *